(12) United States Patent
Farrugia et al.

(10) Patent No.: US 8,412,938 B2
(45) Date of Patent: Apr. 2, 2013

(54) ZERO-KNOWLEDGE BASED AUTHENTICATION METHOD, SYSTEM, AND APPARATUS

(75) Inventors: Augustin J. Farrugia, Cupertino, CA (US); Bertrand Mollinier Toublet, Los Gatos, CA (US); Gianpaolo Fasoli, Palo Alto, CA (US); Mathieu Ciet, Paris (FR); Jill Surdzial, San Jose, CA (US)

(73) Assignee: Apple Inc., Cupertino, CA (US)

( * ) Notice: Subject to any disclaimer, the term of this patent is extended or adjusted under 35 U.S.C. 154(b) by 773 days.

(21) Appl. No.: 12/551,172

(22) Filed: Aug. 31, 2009

(65) Prior Publication Data

US 2011/0055568 A1 Mar. 3, 2011

(51) Int. Cl.
*H04L 29/06* (2006.01)
(52) U.S. Cl. .................................. 713/168; 713/170
(58) Field of Classification Search .................. 713/170, 713/168
See application file for complete search history.

(56) References Cited

U.S. PATENT DOCUMENTS

| | | | | |
|---|---|---|---|---|
| 6,014,085 A | * | 1/2000 | Patel | 455/410 |
| 6,047,242 A | * | 4/2000 | Benson | 702/35 |
| 6,236,981 B1 | * | 5/2001 | Hill | 705/67 |
| 7,773,754 B2 | * | 8/2010 | Buer et al. | 380/277 |
| 8,024,560 B1 | * | 9/2011 | Alten | 713/156 |
| 2007/0076877 A1 | * | 4/2007 | Camp et al. | 380/255 |
| 2007/0101412 A1 | * | 5/2007 | Yang et al. | 726/5 |
| 2007/0266241 A1 | * | 11/2007 | Wu et al. | 713/160 |
| 2010/0106972 A1 | * | 4/2010 | Melen et al. | 713/171 |

* cited by examiner

*Primary Examiner* — Jung Kim
*Assistant Examiner* — Theodore Parsons
(74) *Attorney, Agent, or Firm* — Womble Carlyle Sandridge & Rice LLP (57) ABSTRACT

In the fields of data security and system reliability and qualification, this disclosure is of a method, system and apparatus for verifying or authenticating a device to a host using a zero-knowledge based authentication technique which includes a keyed message authentication code such as an HMAC or keyed cipher function and which operates on secret information shared between the host and the device. This is useful both for security purposes and also to make sure that a device such as a computer peripheral or accessory or component is qualified to be interoperable with the host.

28 Claims, 5 Drawing Sheets

ZERO-KNOWLEDGE BASED AUTHENTICATION METHOD, SYSTEM, AND APPARATUS

FIELD OF THE INVENTION

This disclosure relates to authentication and verification in the computer and data security fields, and more particularly to authentication or qualification of a device.

BACKGROUND

Authentication is well known in the computer/cryptographic fields; typical applications are to ensure that another party (or entity) in a communications context is properly identified. An example of such authentication is that distributors of music and video content using the Internet or other computer networks do so using a Digital Rights Management system (DRM) to protect the content from illicit copying and use. DRM is used to protect digital content transferred over a network and transferred from a computer to an associated playback device. The DRM system is implemented by software resident in the host and audio/video player or associated computer. It is often desirable to make sure that the playback device is an authenticated device as part of the DRM system.

So it is known to first authenticate such a device intended to receive such content (or other valuable information) before transmitting to the device any valuable or important information. More broadly, authentication is a way to verify the identity of another device or entity for purposes of sending information to or receiving information from that other entity.

SUMMARY

This disclosure is directed to a "lightweight" (meaning relatively fast to compute with limited computing resources) authentication or qualification method and associated system and apparatus for authenticating third-party devices of diverse sources by a host, using prior delivery of shared secret information to the device manufacturer or supplier. ("Host" as used generally refers to a computing apparatus with which the device desires to communicate.) This method employs a zero-knowledge based authentication process. In cryptography, a zero-knowledge protocol is an interactive method for a party to prove to another that some statement is true, without revealing to the party information other than the truth of the statement. The present method is another way to authenticate and so is not zero-knowledge.

In this method, the host implementor generates a set of N (N being an integer) batches of randomly generated data, each batch designated $D_{Bi}$ where i=0 to N−1, along with a set of M (M being an integer) randomly generated fixed-size cryptographic keys each designated $D_{aki}$ where i=0 to M−1. (The data and keys are the shared secret information so this is not a true zero-knowledge authentication protocol.) The size of each data batch is not limiting but is for instance in the range of a few thousand bytes.

A randomly selected data batch designated $D_B$ having an assigned unique identifier id (identification number) designated $D_{Bid}$ (where 0<=id<N) and a randomly selected key designated $D_{ak}$ having an assigned unique identifier id (identification number) designated $D_{akid}$ (where 0<=id<M) is provided to the manufacturer of the third-party device i, where i is an index designating e.g. one device. The association between the device identifier (ID) pair which is designated $D_{Bid}, D_{akid}$ and the device is stored at the host, e.g., in computer readable memory. In some embodiments, a single identifier rather than a pair is used for each device.

At arbitrary times during the life cycle of the host, the host requests that the third-party device authenticate itself by computing a keyed hash of a selected portion of its data batch and return its computed hash value (digest), along with its identifier pair ($D_{Bid}, D_{akid}$).

The host can immediately decide to sever communication with the device should it determine that the received identifier pair ($D_{Bid}, D_{akid}$) has been revoked. Should that identifier pair still be valid, the host, having prior knowledge of the associated device data batch and authentication key, is able to verify the validity of the requested data and hence the device. As long as the verification does not fail, the host has no reason to distrust the third-party device and continues to communicate with it. Should verification (authentication) fail, the host may decide to sever communication with the third-party device.

Message authentication codes using hash functions or keyed ciphers are well known in the data security field. The principle is to take data (a digital message, digital signature, etc.) and use it as an entry to e.g. a hash function or keyed cipher, resulting in an output called a "digest" of predetermined length which is intended to uniquely identify ("fingerprint") the message. A secure (cryptographic) hash or cipher is such that any alteration in the message results in a different digest, even though the digest is much shorter than the message. Such functions are "collision-resistant" and "one-way." Some "keyed" hash functions (as described here) conventionally are keyed in the way a particular cipher is keyed.

DETAILED DESCRIPTION

Figure 1:
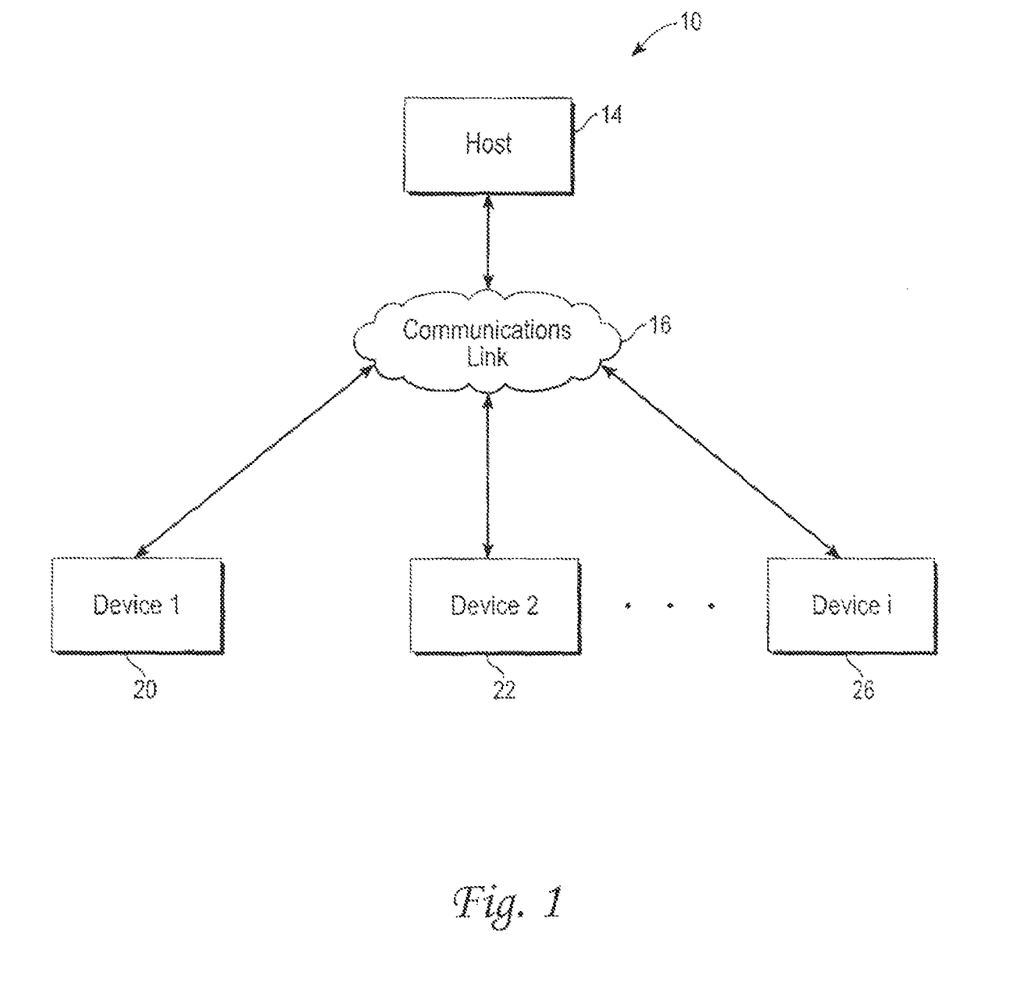
FIG. 1 shows a system in accordance with the invention.

The present invention in some embodiments is used in the exemplary system 10 depicted in FIG. 1 in which each element is largely conventional. In a first embodiment, host 14 is, e.g., a computer server platform such as a server in a DRM (digital rights management) system for distribution and protection of copyrighted digital content. In a second embodiment, host 14 is e.g. a desktop or laptop computer, Smart Phone, audio/video player or other end user computing apparatus. Host 14 is coupled to a communications link 16 such as the Internet in the first embodiment, but which could be another type of communication network, wired or wireless including Ethernet, cellular telephone, etc. In the second embodiment, the communications link is a more local type wired or wireless link such as a USB (universal serial bus), Fire Wire, or internal computer bus. In both embodiments, also coupled to link 16 are one or more (client) devices 20, 22, ..., 26 which are e.g. in the first embodiment consumer electronic devices, other types of computing devices, Smart phones, etc., here respectively designated device 1, device 2, ..., device i. In the second embodiment, devices 20, 22, ..., 26 are e.g. computer or consumer electronic device accessories or components or peripherals such as a computer display screen, a computer optical or hard disc drive, a USB key, or other electronic device which is internal or external to the host and communicates therewith. In this second embodiment, in addition to the security aspect, the present method has the commercial and reliability advantages of allowing only authenticated (qualified) devices to be coupled to or installed in the host, preventing interoperability problems.

At the time of manufacturing (or initialization) of these third-party devices, the organization or person operating or manufacturing the host 14 conventionally establishes a master array or set of N batches $D_{Bi}$ of random data, and M random fixed-size cryptographic keys $D_{aki}$. This master array is stored in memory located in or associated with the host and remains there for the lifetime of the host.

As new third-party devices such as 20, 22, 26 come to life (e.g., are manufactured or initialized), identifier id (identification number) pairs ($D_{Bid}, D_{akid}$) are assigned uniquely to each of these device models and the corresponding data $D_B$ and key $D_{ak}$ are distributed to the device manufacturer by the system implementer (who typically also maintains or manufactures the host) for inclusion (e.g., storage in memory) into each device. A given device model (instance or unit), therefore, stores only one of the many data batches and one of the many keys known by the host.

As the host is updated by the implementer, should the authentication of particular devices be revoked for the purposes of this authentication, the revoked identifier pairs are conventionally recorded at the host as being revoked.

The following authentication process then takes place at arbitrary times during the life of each third-party device, at the prerogative of the host. For this process, it is assumed that each device has stored in it a data batch $D_B$, of size (length) designated $D_{Bsz}$ and the associated data batch identifier designated $D_{Bid}$ and a fixed-size authentication key $D_{ak}$ and the associated key identifier designated $D_{akid}$ as earlier assigned by the host implementer to the manufacturer of the device and as installed into memory in the device as explained above. The key length is, e.g., conventionally about 20 bytes but this (like the other numerical parameters described here) is not limiting.

Furthermore, the process assumes that each such device i can perform a MAC computation such as a keyed hash computation (e.g., the well known HMAC-SHA1 function as defined in RFC 2104 or other keyed hash functions, of which many are known) using the data batches and keys or alternatively a keyed cipher-based MAC computation. HMAC stands for Hash Message Authentication Code (a keyed hash function). The present MAC computation is typically done by an appropriately programmed processor or dedicated logic circuitry resident in the device as explained in further detail below. The notation HMAC(K, D) below indicates the HMAC computation of generic data D using generic key K. More generally, the authentication may use any message authentication code process, including a cipher based MAC.

Figure 2:
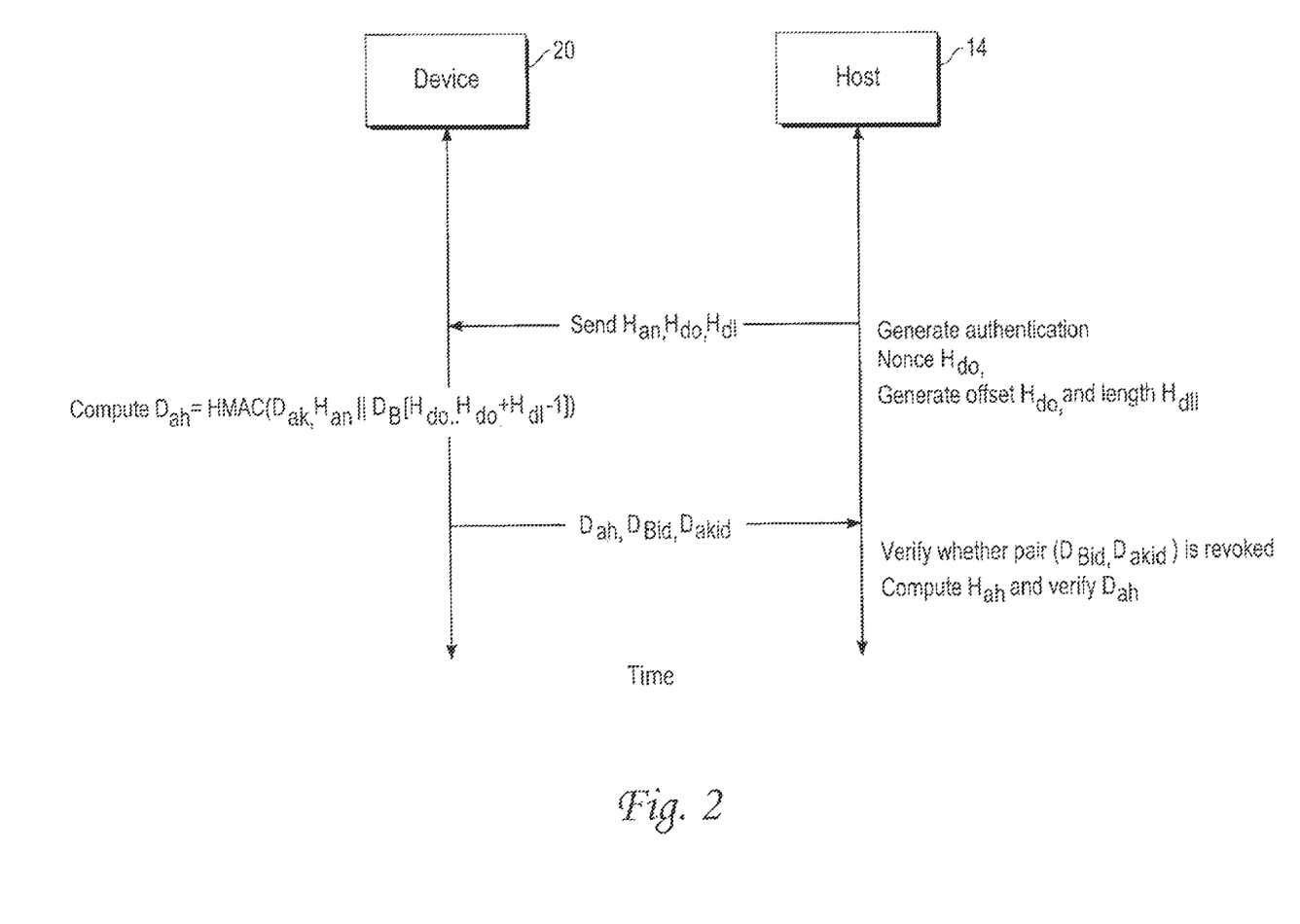
FIG. 2 shows graphically a method in accordance with the invention.

The authentication process, as depicted with time running along the vertical axis in FIG. 2 for the host and device, includes:

1. The host (which is a computing apparatus as explained above) generates a fixed-size random number as an authentication nonce $H_{an}$. (A nonce in cryptography is a random number used once to avoid a replay attack by making each exchange unique.) The nonce is, e.g., of about the same length as the intended hash digest such as about 20 bytes.

2. The host also generates a random offset value designated $H_{do}$ and a random length value designated $H_{dl}$ such that $H_{do}+H_{dl}$ is less than or equal to the total size (e.g., in bits or bytes) $D_{Bsz}$ of the data batch $D_B$ held by the device. These "random" number generations may be performed conventionally, for instance by conventional pseudo random number generator software executed by a processor in the host.

3. The host sends (via communications link 16 to which it is conventionally coupled in FIG. 1 the nonce $H_{an}$, the data offset $H_{do}$ and the data length $H_{dl}$ (which collectively are the data batch selection parameters) generated in steps 1 and 2 to the device. These particular selection parameters are only exemplary.

4. The host sends (via the communications link 16) a request to the device to return the computed authentication hash digest value $D_{ah}$. (Steps 3 and 4 may be combined into one transmission or reversed in order.)

5. The device (also a computing device, see above) computes, e.g., the MAC digest value $D_{ah}$=HMAC($D_{ak}$, $\|D_B[H_{do} \ldots H_{do}+H_{dl}-1]$), that is, the predetermined HMAC or keyed cipher MAC function as keyed by the device key $D_{ak}$, of the data, where the data is the concatenation of the host nonce $H_{an}$ and the subset of the data batch $D_B$ specified as being offset $H_{do}$ and of length $H_{dl}$ in data batch $D_B$.

6. The device sends to the host via the communications link the computed authentication digest value $D_{ah}$ computed in step 5, with its batch identifier which is $D_{Bid}$ and its key identifier which is $D_{akid}$ (which together are the ID pair).

7. The host verifies whether the received ID pair ($B_{Did}$, $D_{akid}$) has been revoked. If so, the host elects to sever communication with the device immediately and the process stops. An error message may be sent to the device by the host at this point.

8. If there is no revocation, then using the received batch identifier $D_{Bid}$ and key identifier $D_{akid}$, the host using that received ID pair looks up the associated data batch $B_D$ and key $D_{ak}$ in its storage and using them and the earlier generated selection parameters $H_{an}$, $H_{do}$, $H_{al}$ independently computes the equivalent MAC digest $D_{ah}$. Note that the data batches do not need each to be stored as a separate entry in the host. Instead the data batches may overlap in the host memory to economize on host memory, and looked up using an addressing scheme with offsets or other conventional addressing techniques. The host then conventionally compares this computed MAC digest $D_{ah}$ to the authentication value $D_{ah}$ received from the device.

If the verification of step 8 fails (no match of the two digests), the host determines that the device is not an authenticated device and severs its communication with the device (e.g., sends an error message or just stops communications). But as long as this authentication exchange is completed successfully (the two digests do match), the host has no reason to distrust that the particular device is authenticated and may continue to communicate with it, in other words the authentication is successful.

Figure 3A:
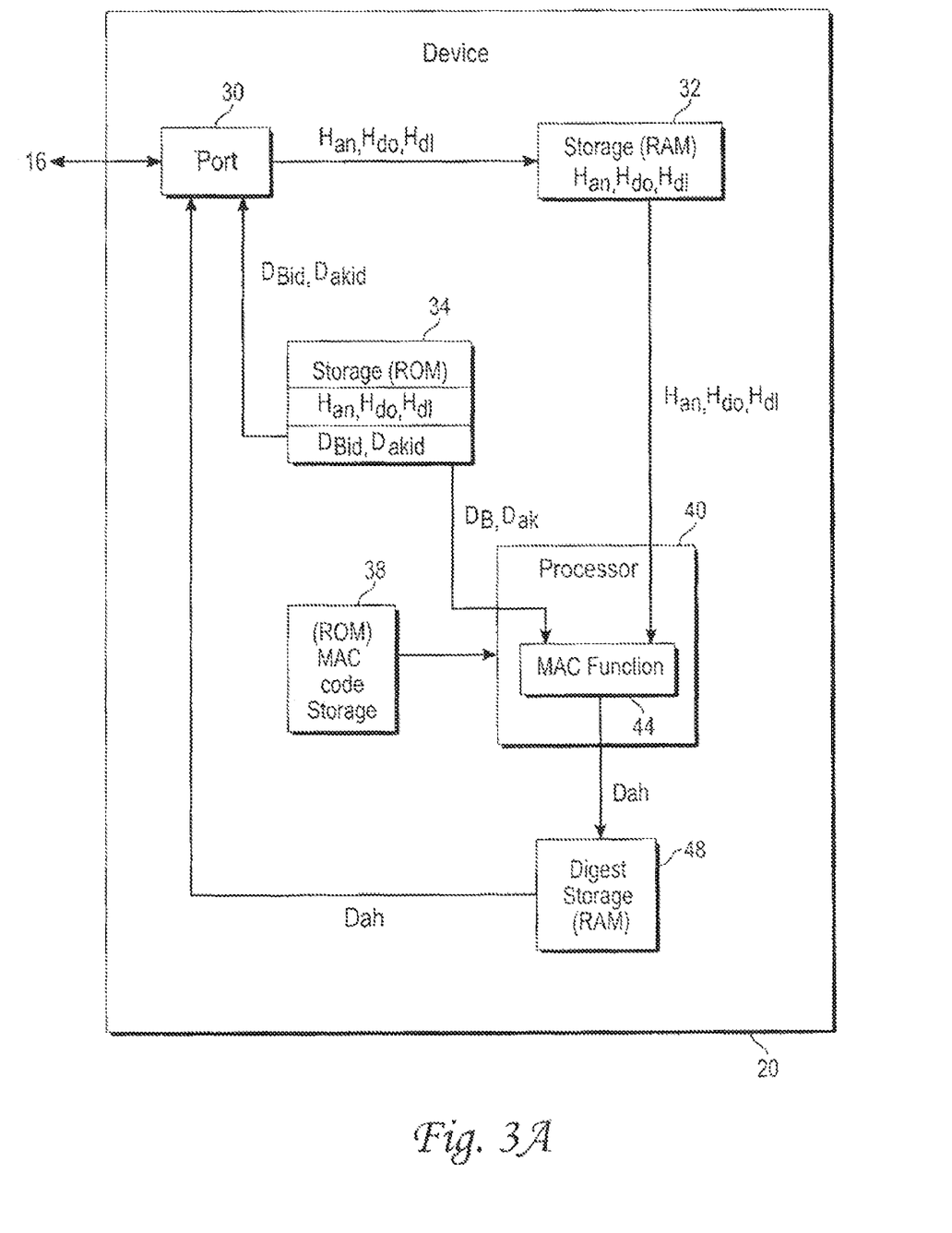
FIG. 3A shows a device in accordance with the invention.

FIG. 3A shows in a block diagram relevant portions of exemplary device 20. Non-relevant portions of the device (those not involved in the authentication process) are conventional and not shown, for ease of illustration. Device 20 includes a conventional access port which is adapted to couple to the external communications link 16. Incoming data or requests are sent to storage (memory such as RAM) 32 or conventional processor 40 as shown. (The processor may be the main processor for the device which also performs other functions, or may be a processor or circuit dedicated to the authentication task.) Also provided is storage 34 (e.g., ROM) which holds the factory installed data, key and ID pair as shown. Also provided is storage 38 (e.g., ROM) storing code (computer software) such as the MAC computation software 40 ("MAC function") to be executed by processor 40. The output of the MAC function 44 is stored in storage (e.g., RAM) 48 also coupled to port 30.

Figure 3B:
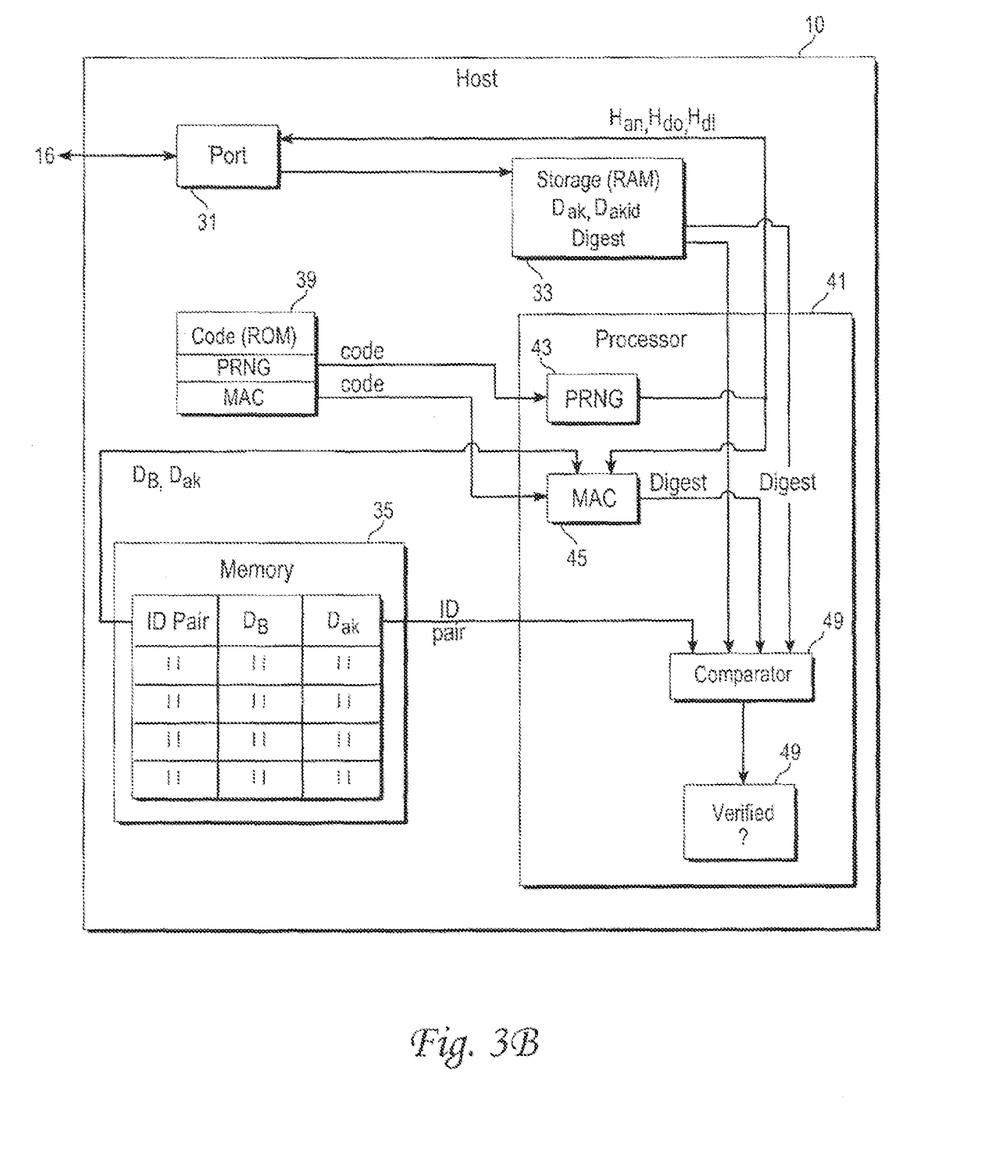
FIG. 3B shows a host in accordance with the invention.

An example of host 14 is depicted in similar block diagram form in FIG. 3B, with many similar elements. Port 31 supports two way communications to link 16. Incoming data (the digest and ID pair from the device) is stored in memory (e.g., RAM) 33. Processor (or equivalent) 41 executes code provided from code memory 39 to do the PRNG calculation in PRNG 43 and the MAC computation in calculator 45. Memory 35 (RAM or ROM) stores the ID pairs and associated data batches and keys. Comparator 47 in processor 41 verifies both the key pairs and the incoming device digests as explained above. Verifier 49 then severs communications or not. Note that the comparator and verifier also me in the form of software executed by the processor. Both are conventional functions.

Figure 4:
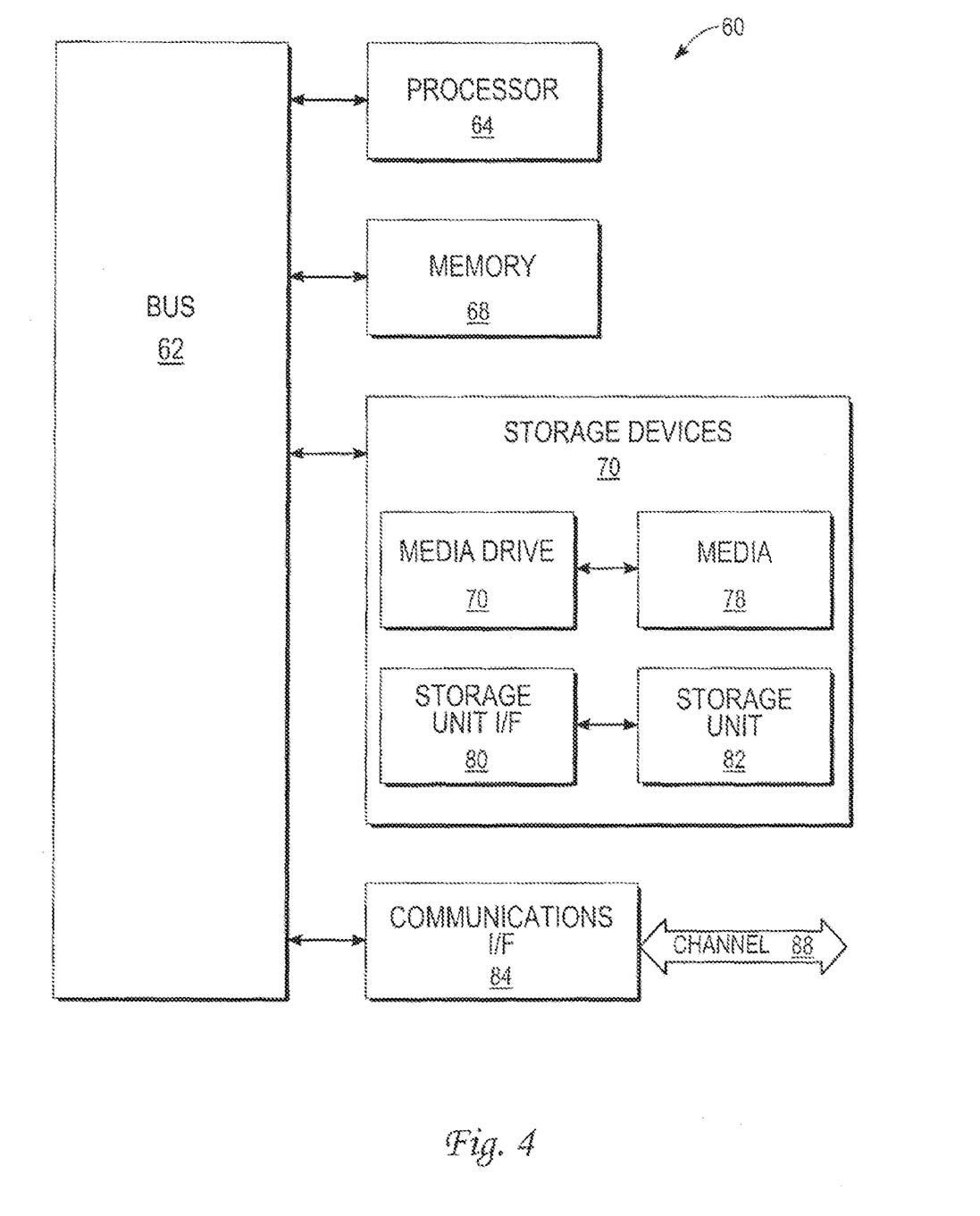
FIG. 4 shows detail of a generic computing device suitable for use as the FIG. 3A device or FIG. 3B host.

FIG. 4 shows further conventional detail of the FIG. 3A device (or the FIG. 3B host) in one embodiment. FIG. 4 illustrates a typical and conventional computing system 60 that may be employed to implement processing functionality in embodiments of the invention. Computing systems of this type may also be used in a computer host (server) or user (client) computer or other computing device or peripheral or accessory or component as described above, for example. Those skilled in the relevant art will also recognize how to implement embodiments of the invention using other computer systems or architectures. Computing system 60 may represent, for example, a desktop, laptop or notebook computer, hand-held computing device (personal digital assistant (PDA), cell phone, consumer electronic device, palmtop, etc.), mainframe, server, client, or any other type of special or general purpose computing device such as a peripheral or accessory or component as explained above as may be desirable or appropriate for a given application or environment. Computing system 60 can include one or more processors, such as a processor 64 (equivalent to processor 40 in FIG. 3A). Processor 64 can be implemented using a general or special purpose processing engine such as, for example, a microprocessor, microcontroller or other control logic. In this example, processor 64 is connected to a bus 62 or other communications medium. Note that in some embodiments the present process is carried out in whole or in part by "hardware" (dedicated circuitry) which is equivalent to the above described software embodiments.

Computing system 60 can also include a main memory 68 (equivalent to memories 32, 48 in FIG. 3A), such as random access memory (RAM or read only memory (ROM)) or other dynamic memory, for storing information and instructions to be executed by processor 64. Main memory 68 also may be used for storing temporary variables or other intermediate information during execution of instructions to be executed by processor 64. Computing system 60 may likewise include a read only memory (ROM) or other static storage (equivalent to memories 34, 38 in FIG. 3A) device coupled to bus 62 for storing static information and instructions for processor 64.

Computing system 60 may also include information storage system 70, which may include, for example, a media drive 72 and a removable storage interface 80. The media drive 72 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 78 may include, for example, a hard disk, floppy disk, magnetic tape, optical disk, CD or DVD, or other fixed or removable medium that is read by and written to by media drive 72. As these examples illustrate, the storage media 78 may include a computer-readable storage medium having stored therein particular computer software or data.

In alternative embodiments, information storage system 70 may include other similar components for allowing computer programs or other instructions or data to be loaded into computing system 60. Such components may include, for example, a removable storage unit 82 and an interface 80, such as a program cartridge and cartridge interface, a removable memory (for example, a flash memory or other removable memory module) and memory slot, and other removable storage units 82 and interfaces 80 that allow software and data to be transferred from the removable storage unit 78 to computing system 60.

Computing system 60 can also include a communications interface 84 (equivalent to port 30 in FIG. 3A). Communications interface 84 can be used to allow software and data to be transferred between computing system 60 and external devices. Examples of communications interface 84 can include a modem, a network interface (such as an Ethernet or other network interface card (NIC)), a communications port (such as for example, a USB port), a PCMCIA slot and card, etc. Software and data transferred via communications interface 84 are in the form of signals which can be electronic, electromagnetic, optical or other signals capable of being received by communications interface 84. These signals are provided to communications interface 84 via a channel 88. This channel 88 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 68, storage device 78, or storage unit 82. These and other forms of computer-readable media may store one or more instructions for use by processor 64, to cause the processor to perform specified operations. Such instructions, generally referred to as "computer program code" (which may be grouped in the form of computer programs or other groupings), when executed, enable the computing system 60 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 60 using, for example, removable storage drive 74, drive 72 or communications interface 84. The control logic (in this example, software instructions or computer program code), when executed by the processor 64, causes the processor 64 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method of authenticating a device at a host, wherein the remote device has associated data and a key, the method comprising the acts of:

generating selection parameters at a processor;

sending an authentication request including the selection parameters to the remote device over a communications link;

receiving from the remote device, responsive to the request, a batch identification, a key identification, and a received digest value, wherein the batch identification identifies a data batch stored in a memory of the host and assigned uniquely to the remote device, and the key identification identifies a key stored in the memory and assigned uniquely to the remote device;

the processor verifying the received batch identification and key identification;

if the received identifications are successfully verified, the processor accessing in memory at the host the key identified by the received key identification and the data batch identified by the received batch identification;

the processor computing a message authentication code value based upon the selection parameters and the accessed data batch keyed by the accessed key; and authenticating the remote device if the message authentication code value matches the received digest value.

2. The method of claim 1, wherein the message authentication code is a hash or keyed cipher message authentication code.

3. The method of claim 1, wherein the processor verifying the received Batch identification and key identification comprises:

determining whether the batch identification and key identification pair has been revoked; and severing communication with the remote device in response to determining that the batch Identification and key identification pair has been revoked 4. The method of claim 1, further comprising the act of generating the selection parameters by a pseudo random process.

5. The method of claim 4, wherein the selection parameters include a nonce, an offset, and a length.

6. The method of claim 1, wherein the data associated with the device is at least 1,000 bytes.

7. The method of claim 5, wherein the message authentication code is a message authentication code of the nonce concatenated with a portion of the accessed data beginning at the offset and extending to the length.

8. The method of claim 1, wherein the host further has stored in memory data and a key for each of a plurality of other devices.

9. A non-transitory computer recordable storage medium storing computer code for carrying out the method of claim 1.

10. A host apparatus programmed to carry out the method of claim 1.

11. A method for a device to authenticate itself to a host, wherein the device has stored data and a stored key and a stored device identification, the method comprising the acts of:

receiving from the host an authentication request including selection parameters over a communications link;

responsive to the request, transmitting a response to the host, the response including the stored device identification and a computed value, wherein the stored device identification includes a batch identification and a key identification, the batch identification identifies a data batch stored in a memory of the host and assigned uniquely to the remote device, and the key identification identifies a key stored in the memory and assigned uniquely to the device, the data batch stored in the memory of the host corresponds to the stored data, and the key stored in the memory corresponds to the stored key;

wherein the device computes the compound value as a message authentication code of the selection parameters and the stored data keyed by the stored key, including the data batch and the key.

12. The method of claim 11, wherein the message authentication code is a harsh or Keyed cipher message authentication code.

13. The method of claim 11, wherein the selection parameters are pseudo random values.

14. The method of claim 13, wherein the selection parameters include a nonce, an offset, and a length.

15. The method of claim 11, wherein the stored data is at least 1,000 bytes.

16. The method of claim 14, wherein the message authentication code is a message authentication code of the nonce concatenated with a portion of the accessed data beginning at the offset and extending to the length.

17. The method of claim 11, wherein the host further has stored in memory data and a key for each of a plurality of other devices.

18. A device apparatus programmed to carry out the method of claim 11.

19. A device which authenticates itself to a host, the device comprising:

a port adapted to receive data from the host;

a computer readable medium which stores data and a key and a device identification;

wherein the port receives from the host over a communications link an authentication request including selection parameters;

a processor coupled to the port and to the computer readable medium and which, responsive to the request, transmits a response to the host via the port, the response including the device identification and a computed value wherein the device identification includes a batch identification and a key identification, the batch identification identifies a data batch stored in a memory of the host and assigned uniquely to the device, and the key identification identifies a key stored in the memory and assigned uniquely to the device, the data batch stored in the memory of the host corresponds to the stored data, and the key stored in the memory corresponds to the stored key;

wherein the processor computes the computed value as a message authentication code of the selection parameters and the stored data keyed by the stored key.

20. A non-transitory computer recordable storage medium storing computer code for carrying out the method of claim 19.

21. The device of claim 18, wherein the message authentication code is a hash or keyed cipher message authentication code.

22. The device of claim 18, wherein the selection parameters are pseudo random values.

23. The device of claim 22, wherein the selection parameters include a nonce, an offset, and a length.

24. The device of claim 19, wherein the stored data is at least 1,000 bytes.

25. The device of claim 23, wherein the message authentication code is a message authentication code of the nonce concatenated with a portion of the accessed data beginning at the offset and extending to the length.

26. The device of claim 19, wherein the host further has stored in memory data and a key for each of a plurality of other devices.

27. A host apparatus which authenticates a device, the host apparatus comprising:

a port adapted to couple to a communications link to transmit data to the device;

a computer readable medium which stores data and a plurality of keys and associated device identifications;

a processor coupled to the computer readable medium and to the port and which transmits to the device via the port an authentication request including selection parameters over a communications link;

wherein the processor, responsive to the request, receives via the port a device identification and a received digest value, wherein the device identification includes a batch identification and a key identification, the batch identification identifies a data batch in the stored data, the data batch assigned uniquely to the device, and the key identification identifies a key from the stored plurality of keys, the identified key assigned uniquely to the device;

wherein the processor verifies the received batch identification and key identification and is verified computes a message authentication code of the selection parameters and the data batch keyed by the identified and authenticates the device if the received digest value matches the computed message authentication code.

28. A method of authenticating a device to a host, each having stored data with an associated batch identification and a stored key with an associated key identification, the method comprising:

generating selection parameters at the host;

sending an authentication request including the selection parameters to the remote device over a communications link;

at the device, responsive to the authentication request, transmitting a response to the host over the communications link, the response including the batch identification and key identification and a value computed as a message authentication code of the selection parameters and the stored data keyed by the key, wherein the batch identification identifies a data batch in the stored data, the data batch assigned uniquely to the device, and the key identification identifies a key in the stored data, the identified key assigned uniquely to the device;

receiving the response host;

verifying the batch identification and the key identification; and authenticating the remote device by computing the message authentication code of the Selection parameters and the data batch keyed by the identified key stored at the host.

* * * * *